US008736624B1

(12) United States Patent
Mahan et al.

(10) Patent No.: US 8,736,624 B1
(45) Date of Patent: May 27, 2014

(54) CONDITIONAL EXECUTION FLAG IN GRAPHICS APPLICATIONS

(75) Inventors: Justin Michael Mahan, Fremont, CA (US); Edward A. Hutchins, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 852 days.

(21) Appl. No.: 11/893,514

(22) Filed: Aug. 15, 2007

(51) Int. Cl.
G06T 1/00 (2006.01)
G06T 15/00 (2006.01)

(52) U.S. Cl.
USPC ............................................ 345/522

(58) Field of Classification Search
None
See application file for complete search history.

(56) References Cited

U.S. PATENT DOCUMENTS

| | | |
|---|---|---|
| 4,620,217 A | 10/1986 | Songer |
| 4,648,045 A | 3/1987 | Demetrescu |
| 4,700,319 A | 10/1987 | Steiner |
| 4,862,392 A | 8/1989 | Steiner |
| 4,901,224 A | 2/1990 | Ewert |
| 5,185,856 A | 2/1993 | Alcorn et al. |
| 5,357,604 A | 10/1994 | San et al. |
| 5,392,393 A | 2/1995 | Deering |
| 5,491,496 A | 2/1996 | Tomiyasu |
| 5,577,213 A | 11/1996 | Avery et al. |
| 5,581,721 A | 12/1996 | Wada et al. |
| 5,600,584 A | 2/1997 | Schlafly |
| 5,655,132 A | 8/1997 | Watson |
| 5,850,572 A | 12/1998 | Dierke |
| 5,941,940 A | 8/1999 | Prasad et al. |
| 5,977,977 A | 11/1999 | Kajiya et al. |
| 6,118,452 A | 9/2000 | Gannett |
| 6,173,366 B1 | 1/2001 | Thayer et al. |
| 6,333,744 B1 | 12/2001 | Kirk et al. |
| 6,351,806 B1 | 2/2002 | Wyland |
| 6,353,439 B1 | 3/2002 | Lindholm et al. |
| 6,466,222 B1 | 10/2002 | Kao et al. |
| 6,496,537 B1 | 12/2002 | Kranawetter et al. |
| 6,526,430 B1 | 2/2003 | Hung et al. |
| 6,557,022 B1 | 4/2003 | Sih et al. |
| 6,624,818 B1 | 9/2003 | Mantor et al. |
| 6,636,221 B1 | 10/2003 | Morein |
| 6,636,223 B1 | 10/2003 | Morein |
| 6,778,181 B1 | 8/2004 | Kilgariff et al. |

(Continued)

FOREIGN PATENT DOCUMENTS

JP  62080785   4/1987
JP  05150979 A2  6/1993

(Continued)

OTHER PUBLICATIONS

Hutchins E., SC10: A Video Processor and Pixel-Shading GPU for Handheld Devices; presented at the Hot Chips conference on Aug. 23, 2004.*

(Continued)

*Primary Examiner* — Carlos Perromat (57) ABSTRACT

Detailed herein are approaches to enabling conditional execution of instructions in a graphics pipeline. In one embodiment, a method of conditional execution controller operation is detailed. The method involves configuring the conditional execution controller to evaluate conditional test. A pixel data packet is received into the conditional execution controller, and evaluated, with reference to the conditional test. A conditional execution flag, associated with the pixel data packet, is set, to indicate whether a conditional operation should be performed on the pixel data packet.

17 Claims, 5 Drawing Sheets

Flowchart 400

(56) References Cited

U.S. PATENT DOCUMENTS

| | | |
|---|---|---|
| 6,806,886 B1 | 10/2004 | Zatz |
| 6,839,828 B2 | 1/2005 | Gschwind et al. |
| 6,924,808 B2 | 8/2005 | Kurihara et al. |
| 6,947,053 B2 | 9/2005 | Malka et al. |
| 6,980,209 B1 | 12/2005 | Donham et al. |
| 6,999,100 B1 | 2/2006 | Leather et al. |
| 7,280,112 B1 | 10/2007 | Hutchins |
| 7,298,375 B1 | 11/2007 | Hutchins |
| 7,477,260 B1 | 1/2009 | Nordquist |
| 7,659,909 B1 | 2/2010 | Hutchins |
| 7,710,427 B1 | 5/2010 | Hutchins et al. |
| 7,928,990 B2 | 4/2011 | Jiao et al. |
| 7,941,645 B1 | 5/2011 | Riach et al. |
| 2002/0129223 A1 | 9/2002 | Takayama et al. |
| 2002/0169942 A1 | 11/2002 | Sugimoto |
| 2003/0115233 A1 | 6/2003 | Hou et al. |
| 2004/0114813 A1 | 6/2004 | Boliek et al. |
| 2004/0126035 A1 | 7/2004 | Kyo |
| 2004/0130552 A1 | 7/2004 | Duluk, Jr. et al. |
| 2005/0122330 A1 | 6/2005 | Boyd et al. |
| 2005/0135433 A1 | 6/2005 | Chang et al. |
| 2005/0223195 A1 | 10/2005 | Kawaguchi |
| 2006/0028469 A1 | 2/2006 | Engel |
| 2006/0152519 A1* | 7/2006 | Hutchins et al. ............ 345/561 |
| 2006/0155964 A1 | 7/2006 | Totsuka |
| 2006/0177122 A1 | 8/2006 | Yasue |
| 2006/0288195 A1 | 12/2006 | Ma et al. |
| 2007/0268289 A1* | 11/2007 | Yu et al. .................. 345/422 |
| 2007/0279408 A1 | 12/2007 | Zheng et al. |
| 2007/0285427 A1 | 12/2007 | Morein et al. |

FOREIGN PATENT DOCUMENTS

| | | |
|---|---|---|
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2006196004 | 7/2006 |
| WO | 2005114646 | 12/2005 |

OTHER PUBLICATIONS

"Interleaved Memory." Dec. 26, 2002. http://www.webopedia.com/TERM/I/interleaved_memory.html.

Pirazzi, Chris. "Fields, F1/F2, Interleave, Field Dominance and More." Nov. 4, 2001. http://lurkertech.com/lg/dominance.html.

Hennessy, et al., Computer Organization and Design: The Hardware/Software Interface, 1997, Section 6.5.

Moller, et al.; Real-Time Rendering, 2nd ed., 2002, A K Peters Ltd., pp. 92-99, 2002.

Hollasch; IEEE Standard 754 Floating Point Numbers; http://steve.hollasch.net/cgindex/coding/ieeefloat.html; dated Feb. 24, 2005; retrieved Oct. 21, 2010.

Microsoft; (Complete) Tutorial to Understand IEEE Floating-Point Errors; http://support.microsoft.com/kb/42980; dated Aug. 16, 2005; retrieved Oct. 21, 2010.

\* cited by examiner

Flowchart 400

FIG. 4

Flowchart 500

CONDITIONAL EXECUTION FLAG IN GRAPHICS APPLICATIONS

FIELD OF THE INVENTION

The present invention is generally related to programming graphics computer systems.

BACKGROUND OF THE INVENTION

As computer technology improves, software developers continue to push the performance of technology. This is particularly true in the field of graphics technology, where new API standards are developed and proliferated to take advantage of improvements in graphics performance. One recent development is the OpenGL 2.0 standard, which institutes support for conditional execution of graphical instructions.

These conditional instructions allow for situations where a particular pixel may or may not be subject to a particular effect. For example, a software developer may use conditionals when rendering a wooden boat moving through water. Depending on various factors, e.g., the calculated weight of the boat, its speed through the water, and various weather conditions, a particular portion of the hull of the boat may or may not be wet. Conditional execution allows the programmer to program a graphics pipeline to handle either scenario. As such, the graphics pipeline can render an image faster, by requiring fewer instruction sets, than may be possible if conditional operations were not allowed.

At present, many implementations of conditional execution rely upon processing a packet both ways; that is, performing the calculations twice, once with the conditional as true, and once with the conditional as false. After both know paths have been calculated, the conditional is evaluated, and the appropriate result selected; the other result is discarded. This approach, while reasonably effective, is inefficient. The extra calculations performed to determine the discarded result represent a power drain, and may require additional time to perform, e.g., if memory access is required during the calculation.

SUMMARY OF THE INVENTION

Detailed herein are approaches to enabling conditional execution of instructions in a graphics pipeline. In one embodiment, a method of conditional execution controller operation is detailed. The method involves configuring the conditional execution controller to evaluate conditional test. A pixel data packet is received into the conditional execution controller, and evaluated, with reference to the conditional test. A conditional execution flag, associated with the pixel data packet, is set, to indicate whether a conditional operation should be performed on the pixel data packet.

Another embodiment is described, in which a graphics processing unit (GPU) for loading and executing a shader program is described. The GPU includes an integrated circuit die, which includes a number of stages of the GPU. The GPU also includes a memory interface for interfacing with the graphics memory, and a host interface for interfacing with computer system. The stages make up a graphics pipeline, which is configured to load instructions for several of the stages within the graphics pipeline, received a pixel data packet, and evaluate the pixel data packet with reference to a conditional test. The result from the conditional test is used to determine whether or not to apply a conditional instruction to the pixel data packet.

Another embodiment is detailed, describing a method of conditional execution of instructions. The method entails loading a number of instructions into a functional module, including a conditional instruction. A pixel data packet is evaluated using a conditional test, and the result of the conditional test is used to determine whether or not to apply the conditional instruction to the pixel data packet.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION
CONDITIONAL EXECUTION

In the following embodiments, a streamlined approach to conditional execution within a graphics pipeline is described. Several of the embodiments detailed herein describe a graphics pipeline which includes a conditional execution controller. The conditional execution controller is used to evaluate the conditional operations, before pixel data packets have been processed by the graphics pipeline. Depending on the results of this evaluation, the conditional execution controller may set a conditional execution (CX) flag for a given pixel data packet. The remaining functional modules within the graphics pipeline can then determine whether or not to perform a conditional operation on the data packet, with reference to this CX flag.

Use of the CX flag and the conditional execution controller offers substantial advantages over other approaches. By evaluating the conditional operation before other pipeline instructions are performed, the superfluous duplication inherent in the existing approaches is eliminated. In turn, by preventing unnecessary evaluation of graphics instructions, a graphics processing unit (GPU) which includes an embodiment of this conditional execution pipeline offers a significant power consumption savings over a similar GPU which lacks this conditional execution optimization. Similarly, if the conditional instructions involve memory access, the combination of the CX flag and the conditional execution controller and will lead to faster graphics rendering.

Exemplary Computing Environment

Figure 1:
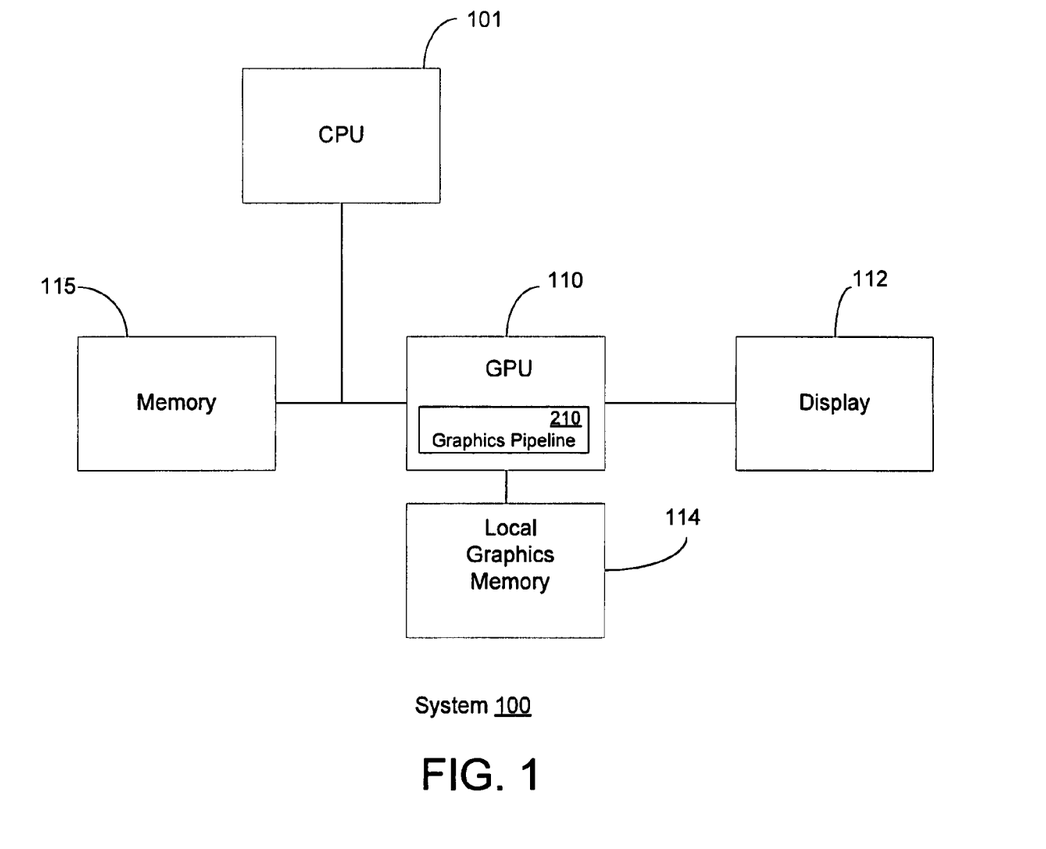
FIG. 1 shows a computer system in accordance with one embodiment of the present invention.

FIG. 1 shows a computer system 100 in accordance with one embodiment of the present invention. The depicted computer system includes the components of a basic computer system in accordance with embodiments of the present invention providing the execution platform for certain hardware-based and software-based functionality. In general, the computer system comprises at least one CPU 101, a system memory 115, and at least one graphics processor unit (GPU) 110. The CPU can be coupled to the system memory via a bridge component/memory controller (not shown) or can be directly coupled to the system memory via a memory controller (not shown) internal to the CPU. The GPU is coupled to a display 112. One or more additional GPUs can optionally be coupled to the system to further increase its computational power. The GPU(s) is coupled to the CPU and the system memory. The system can be implemented as, for example, a desktop computer system or server computer system, having a powerful general-purpose CPU coupled to a dedicated graphics rendering GPU. In such an embodiment, components can be included that add peripheral buses, specialized graphics memory, JO devices, and the like. Similarly, the system can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU can be implemented as a discrete component, a discrete graphics card designed to couple to the computer system via a connector (e.g., AGP slot, PCI-Express slot, etc.), a discrete integrated circuit die (e.g., mounted directly on a motherboard), or as an integrated GPU included within the integrated circuit die of a computer system chipset component (not shown), or within the integrated circuit die of a PSOC (programmable system-on-a-chip). Additionally, a local graphics memory 114 can be included for the GPU for high bandwidth graphics data storage. The GPU is depicted as including pipeline 210, which is described in greater detail below, with reference to FIGS. 2 through 5.

Exemplary Graphics Processing Unit

Figure 2:
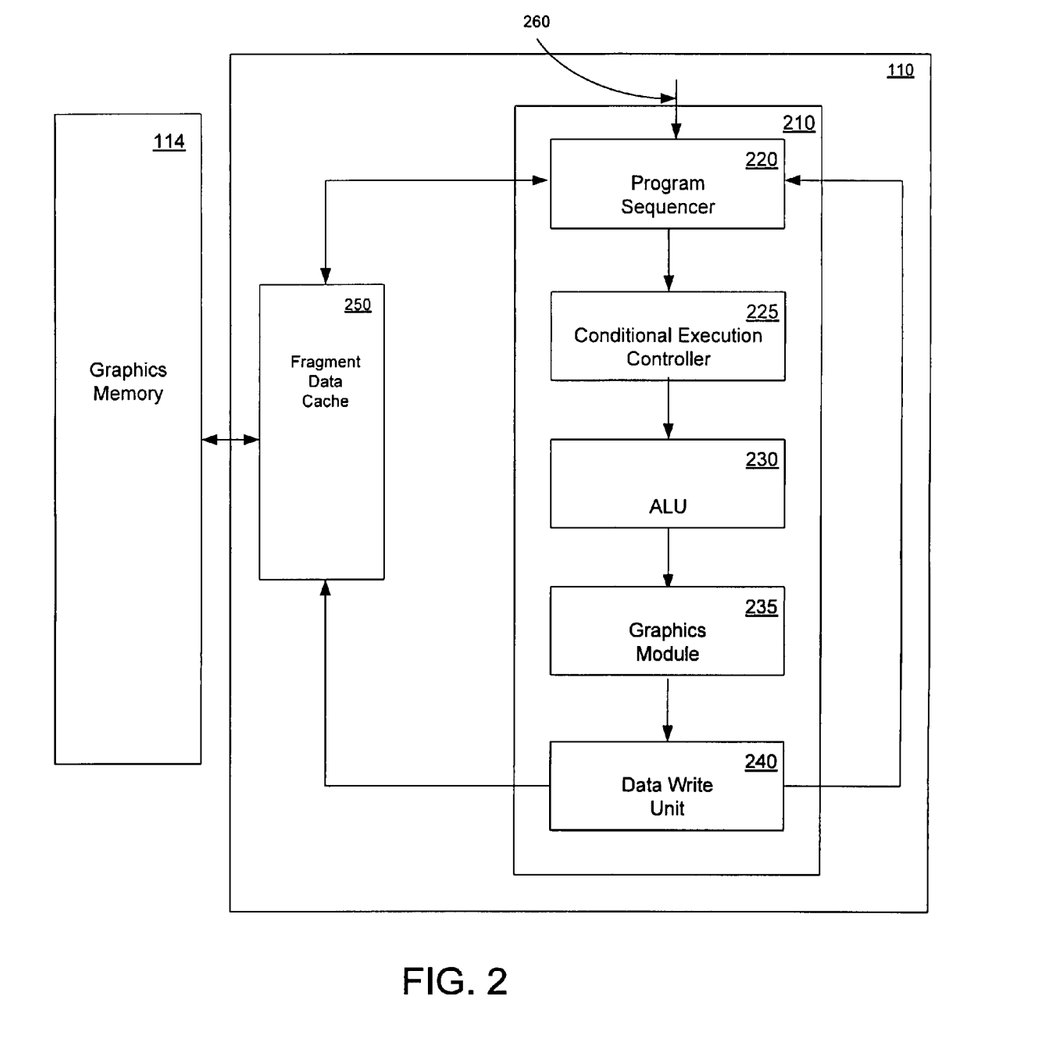
FIG. 2 shows a diagram illustrating internal components of a GPU and a graphics memory in accordance with one embodiment of the present invention.

FIG. 2 shows internal components of the GPU and the graphics memory in accordance with one embodiment of the present invention. As depicted in FIG. 2, the GPU 110 includes a graphics pipeline 210 and a fragment data cache 250 which couples to the graphics memory 114.

As depicted in FIG. 2, the graphics pipeline includes a number of functional modules. Several such functional modules have been illustrated, e.g., program sequencer 220, conditional execution controller 225, ALU 230, graphics module 235, and data write component 240. The functional modules included in the graphics pipeline operate by rendering graphics primitives that are received from a graphics application, e.g., from a graphics driver. In the depicted embodiment, the functional modules access information for rendering the pixels related to the graphics primitives via the fragment data cache 250. The fragment data cache operates as a high-speed cache for information stored in the graphics memory, e.g., the frame buffer memory.

In some embodiments, the graphics pipeline may be utilized for other, non-graphics purposes. For example, the graphics pipeline, and the GPU, may be utilized to implement general-purpose GPU operations, e.g., physical simulation, such as the draping of cloth across an object, can be calculated using graphics hardware such as the GPU and the graphics pipeline. While embodiments below are described in terms of operating on graphics primitives, it is understood that other embodiments are well suited to applications involving non-graphics oriented applications.

The program sequencer functions by controlling the operation of the functional modules of the graphics pipeline. The program sequencer can interact with the graphics driver (e.g., a graphics driver executing on the CPU) to control the manner in which the functional modules of the graphics pipeline receive information, configure themselves for operation, and process graphics primitives. For example, in the FIG. 2 embodiment, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the graphics pipeline over a common input 260 from an upstream functional module (e.g., from an upstream raster module, from a setup module, or from the graphics driver). The input functions as the main fragment data pathway, or pipeline, between the functional modules of the graphics pipeline. Primitives are generally received at the "top" of the pipeline and are progressively rendered into resulting rendered pixel data as they proceed from one module to the next along the pipeline.

In one embodiment, data proceeds between the various functional modules in a packet based format. For example, the graphics driver transmits data to the GPU in the form of data packets are specifically configured to interface with and be transmitted along the fragment pipe communications pathways of the pipeline. Such data packets may include pixel packets or register packets. The pixel packets generally includes information regarding a group or tile of pixels (e.g., 4 pixels, 8 pixels, 16 pixels, etc.) and coverage information for one or more primitives that relate to the pixels. The register packets can include configuration information that enables the functional modules of the pipeline to configure themselves for rendering operations. For example, the register packets can include configuration bits, instructions, functional module addresses, etc. that that can be used by one or more of the functional modules of the pipeline to configure itself for the current rendering mode, or the like. In addition to pixel rendering information and functional module configuration information, the data packets can include shader program instructions that program the functional modules of the pipeline to execute shader processing on the pixels. For example, the instructions comprising a shader program can be transmitted down the graphics pipeline and be loaded by one or more designated functional modules. Once loaded, during rendering operations, the functional module can execute the shader program on the pixel data to achieve the desired rendering effect.

In some embodiments, pixel packets may make multiple passes through the graphics pipeline. For example, as a packet is processed through the graphics pipeline, some of the instructions in a particular functional module may be performed on that packet during an initial pass, and additional instructions may be performed during a subsequent pass. In the depicted embodiment, if a packet is to pass through the graphics pipeline an additional time, it is returned to the program sequencer, which may pass it through the graphics pipeline for additional processing. In another embodiment, the data write unit may pass the partially-processed data packet to the fragment data cache, and the program sequencer may retrieve the packet for additional processing. As is explained below, some embodiments utilize this approach to enable additional instructions to be loaded into the graphics pipeline modules.

In some embodiments, as noted above, such shader program instructions are passed as packets through the graphics pipeline, and loaded into one or more designated functional modules. One such embodiment "labels" instruction packets to identify which functional module or modules should utilize the instructions contained therein, e.g., by including a memory address or pointer in the packet header, indicating which instruction table the instruction packet is intended for. For example, as an instruction packet passes through a functional module, one of three possible results may occur, based upon the header for the packet: the packet is not intended for that module, and so the module ignores the packet and passes it along the graphics pipeline; the packet is intended solely for that module, and so the module utilizes the instructions contained therein, and "consumes" the packet, not passing it down the graphics pipeline; or the packet is intended for several modules, including the current module, and so the module utilizes the instructions contained therein, and passes the packet down the graphics pipeline.

In one embodiment, the GPU stores the span of pixels in graphics memory subsequent to program execution for the first portion. This clears the stages of the pipeline to be used for loading instructions for the second portion. Subsequent to loading instructions from the second portion, the GPU accesses the span of pixels in the graphics memory to perform program execution for the second portion. In this manner, the program sequencer loads the first portion of the shader program, processes the span of pixels in accordance with the first portion, temporarily stores the intermediate result in the graphics memory, loads the second portion of the shader program, retrieves the intermediate results from the graphics memory and processes the span of pixels (e.g., the intermediate results) in accordance with the second portion. This process can be repeated until all portions of an indeterminate length shader program have been executed and the span of pixels have been complete a processed. The resulting processed pixel data is then transferred to the graphics memory for rendering onto the display.

As shown, the graphics pipeline includes a conditional execution controller 225. The conditional execution controller, in the depicted embodiment, is used to test pixel data packets as they are passed through the graphics pipeline, and determine which "branch" of instructions should be applied to that particular packet. As noted previously, some graphics APIs, e.g., OpenGL 2.0, allow for conditional tests within the graphics pipeline. These conditional tests can be used to determine, for example, which rendering techniques or which textures should be used for a particular pixel. As is described in greater detail below, the conditional execution controller can be configured to evaluate any such conditional tests before the pixel data packets are processed. This allows for a more efficient graphics pipeline, in that redundant or unnecessary operations can be avoided.

In the depicted embodiment, the conditional execution controller is shown as a discrete functional module within the graphics pipeline. In other embodiments, the functionality of the conditional execution controller may be incorporated into another functional module, e.g., the ALU. Similarly, in other embodiments, the functionality of the conditional execution controller may be split across multiple functional modules.

Exemplary Pixel Data Packet

Figure 3:
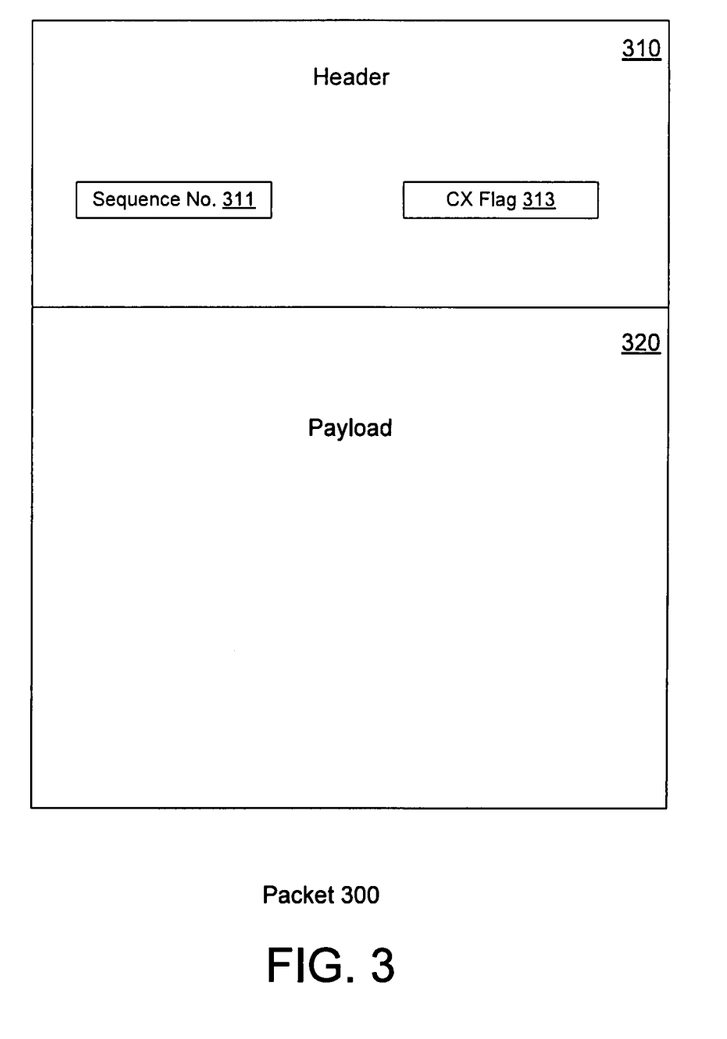
FIG. 3 shows an exemplary pixel data packet, in accordance with one embodiment.

With reference now to FIG. 3, an exemplary pixel data packet 300 is depicted, in accordance with one embodiment. While the pixel data packet is shown as incorporating specific, enumerated features and elements, it is understood that embodiments are well suited to applications involving additional, fewer, or different features, elements, or arrangements.

The pixel data packet is shown as including both header 310, and payload 320. For data packets being passed through a graphics pipeline, the header contains information relevant to the processing of the data contained in the payload. For example, the header is shown in FIG. 3 as including sequence number 311 and conditional execution (CX) flag 313. In the depicted embodiment, the sequence number identifies, for example, the relative position of the packet within a pixel sequence, e.g., a single pixel may be spread across four packets, and the sequence number identifies which of those four packets the current packet is. The payload of the pixel data packet contains some or all of the data associated with a particular pixel.

Conditional Execution of Instructions

Figure 4:
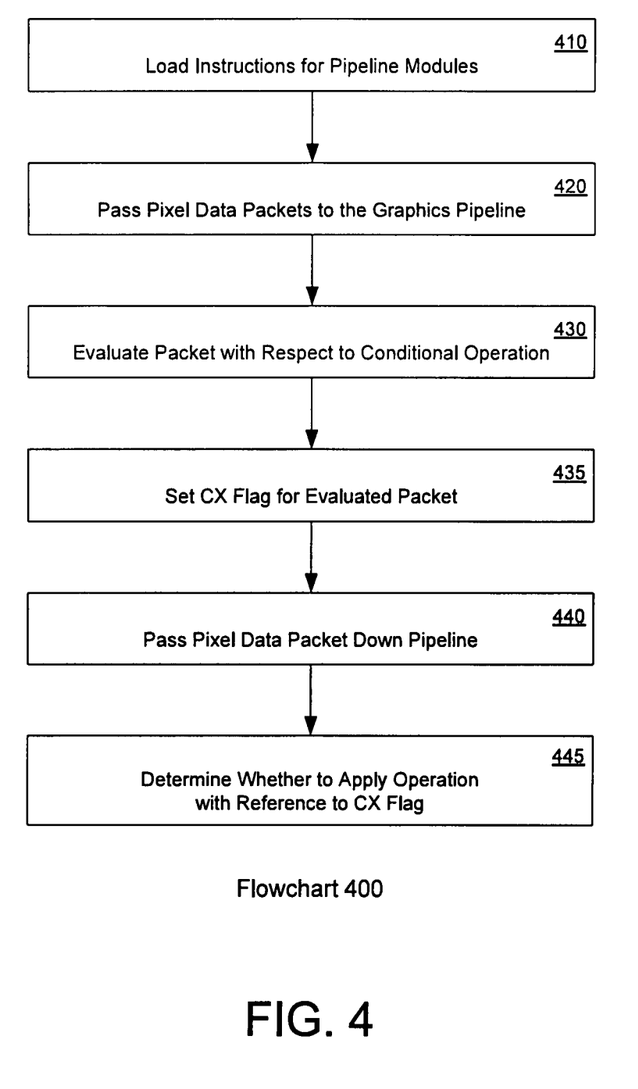
FIG. 4 is a flowchart of a method of conditional execution of instructions, in accordance with one embodiment.

With reference now to FIG. 4, a flowchart 400 of a method of conditional execution of instructions is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410, instructions are loaded for functional modules within a pipeline. In some embodiments, these instructions may incorporate conditional elements, such that not every pixel which is rendered by the pipeline is subjected to the same instructions. In some embodiments, instructions are loaded into the instruction tables for functional modules by passing them through the pipeline, e.g., as described above, with reference to FIG. 2. In other embodiments, other approaches are utilized for loading instructions.

With reference to step 420, pixel data packets are passed to the graphics pipeline. In some embodiments, a data source, e.g., a graphics driver, passes raw pixel data to the GPU, and hence to the graphics pipeline, for rendering. This raw pixel data is often encapsulated as a series of pixel data packets, such as described above with reference to FIG. 3.

With reference now to step 430, a pixel data packet is evaluated, with respect to a conditional operation. As noted previously, not every pixel data packet which passes through a graphics pipeline needs to be subjected to the same operations. In order to reduce or eliminate redundant processing of data packets, some embodiments determine which conditional operations should be applied to a particular data packet. One embodiment utilizes a conditional execution controller, which determines whether a conditional instruction should be applied to a particular data packet.

With reference to step 435, a conditional execution (CX) flag is set for the evaluated pixel data packet, indicating whether or not a conditional operation should be performed on that data packet. In some embodiments, a single flag is utilized, e.g., a single bit can be set in the header of the pixel data packet, indicating simply whether a functional module in the graphics pipeline should carry out operations on that packet or not. In other embodiments, a more granular approach can be utilized, e.g., a mask of bits can be utilized, to indicate which particular instructions should or should not be performed on the packet. This latter embodiment allows for multiple conditional operations to be evaluated, within the same graphics pipeline at the same time.

With reference now to step 440, the pixel data packet is passed down the graphics pipeline, to each functional module in turn.

With reference now to step 445, if a particular functional module has been configured to perform a conditional operation, it may read the CX flag associated with the pixel data packet to determine whether or not to apply the conditional operation.

Conditional Execution Controller Operation

Figure 5:
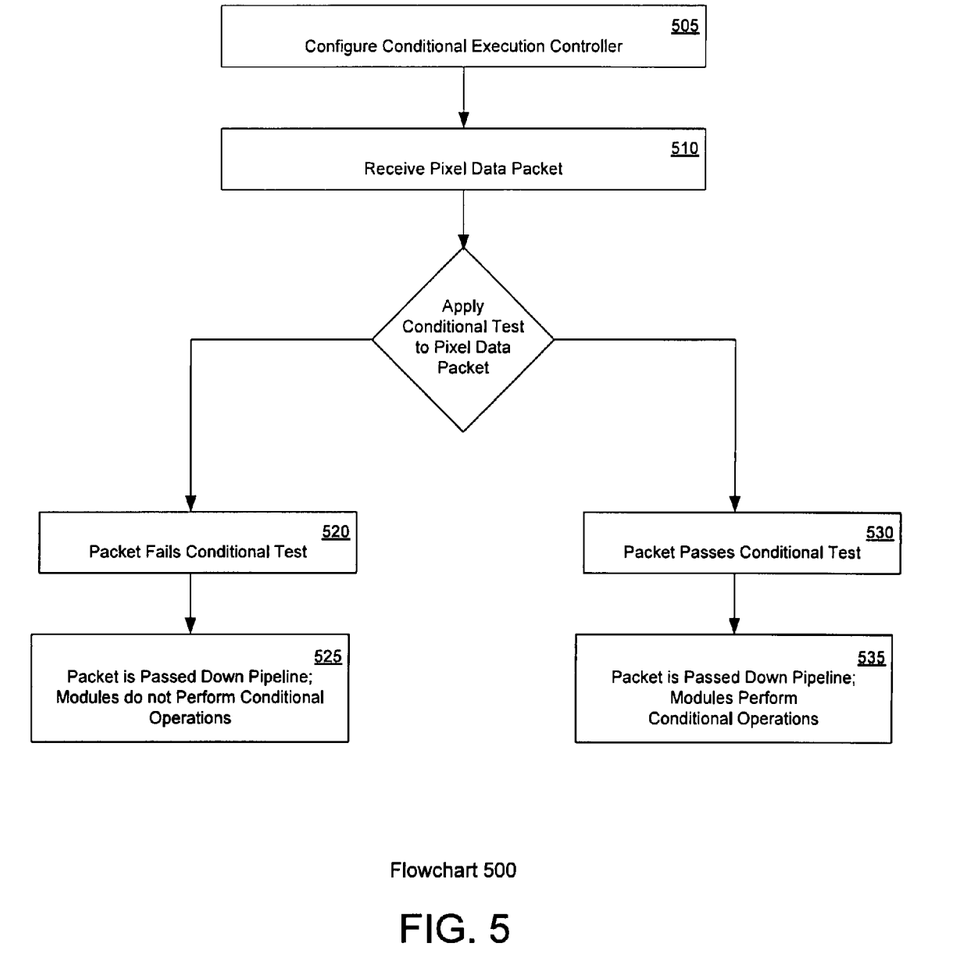
FIG. 5 is a flowchart of a method of conditional execution controller operation, in accordance with one embodiment.

With reference now to FIG. 5, a flowchart 500 of a method of conditional execution controller operation is depicted, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference to step 505, a conditional execution controller is configured to evaluate a conditional test. As noted previously, some graphical APIs, e.g., OpenGL 2.0, allow for conditional tests within a single graphics pipeline, e.g., to determine whether or not to apply a particular rendering technique to a particular data packet. In some embodiments, a conditional execution controller is configured with instructions to evaluate a received data packet, with reference to this conditional test. In several such embodiment, the conditional execution controller is so configured by passing instruction packets down the graphics pipeline, which the conditional execution controller uses to load instruction tables. In other embodiments, other approaches are utilized for configuring such a conditional execution controller.

With reference to step 510, a pixel data packet is received by the conditional execution controller. In some embodiments, as described previously, pixel data is passed to a graphics processing unit (GPU) and hence to the graphics pipeline, in the form of raw pixel data. This pixel data is then broken into a series of data packets, which are passed through the graphics pipeline and rendered into a final image for display. In some embodiments, such as that depicted in FIG. 2, the graphics pipeline includes a conditional execution controller near the beginning of the pipeline. This conditional execution controller is configured to evaluate one or more conditional operations, with respect to the received pixel data packets. In the depicted embodiment, such an evaluation may have one of two possible outcomes.

With reference now to step 520, the received pixel data packet "fails" the conditional test, or the test is inapplicable to that particular pixel data packet. In some embodiments, not every pixel needs to be subjected to the same graphics pipeline operations; a conditional test is used to determine whether or not to apply these optional instructions to a particular pixel data packet. In these embodiments, "failing" the conditional test indicates that this particular pixel data packet does not require the optional instructions. As such, in these embodiments, the conditional execution controller does not enable the conditional execution (CX) flag for this pixel data packet.

With reference now to step 525, the pixel data packet is passed down the graphics pipeline. Functional modules within the pipeline will examine the pixel data packet, to determine if the CX flag is set. If the CX flag is not set, these functional modules will not perform any optional instructions.

With reference to step 530, the received pixel data packet "passes" the conditional test. As such, the conditional execution controller has determined that this pixel data packet requires optional processing. The conditional execution controller therefore sets a CX flag, e.g., by initializing a bit within the header of the pixel data packet.

With reference now to step 535, the pixel data packet is passed down the graphics pipeline. Such a modules within the pipeline will examine the pixel data packet, to determine if the CX flag is set. As the CX flag is set, these functional modules will perform any optional instructions.

It is understood that while the method described in flowchart 500 associates certain values with "passing" or "failing" a conditional test, this embodiment is exemplary. In other embodiments, values may be reversed, e.g., a packets may "pass" a conditional test if it does not require additional processing. Moreover, it is understood that a conditional execution controller may implement multiple conditional tests, and set multiple CX flags as appropriate, e.g., a "mask" of CX bits, indicating a number of operations that should or should not be performed on a particular pixel data packet.

Similarly, while the embodiment of flowchart 500 describes the conditional test as testing for optional operations, embodiments are well suited to applications wherein such operations are not optional, and the conditional test is used to exempt a packet from a particular operation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are thus described. While the present invention has been described in particular embodiments, it should be appreciated that the present invention should not be construed as limited by such embodiments, but rather construed according to the following claims.

What is claimed is:

1. A method of conditional execution controller operation, said method comprising:

configuring said conditional execution controller to evaluate a conditional test based on an instruction packet;

receiving a pixel data packet into said conditional execution controller;

evaluating said pixel data packet, with reference to said conditional test; and setting a conditional execution flag, associated with said pixel data packet, to indicate whether a conditional operation should be performed on said pixel data packet, wherein said conditional execution flag is set based on said conditional test prior to said pixel data packet being processed by an arithmetic logic unit (ALU), and wherein said conditional test is operable to comprise a plurality of conditional operations to be evaluated, and wherein said conditional execution flag comprises a plurality of indicators each corresponding to a respective conditional operation associated with said pixel data packet and each of said plurality of indicators operable to indicate whether a respective instruction of a plurality of instructions are to be performed on said pixel data packet.

2. The method of claim 1, wherein said configuring said conditional execution controller comprises:
accessing a plurality of conditional instructions stored in a memory;
encapsulating said plurality of conditional instructions in a plurality of register packets; and
forwarding said plurality of register packets to said conditional execution controller.

3. The method of claim 1, wherein said receiving said pixel data packet comprises receiving said pixel data packet from a software controller.

4. The method of claim 1, wherein said evaluating said pixel data packet comprises determining whether said pixel data packet conforms to a requirement of said conditional test.

5. The method of claim 1, wherein said setting said conditional execution flag comprises initializing a bit value in a header of said pixel data packet.

6. The method of claim 1, further comprising:
examining said conditional execution flag to determine whether or not to perform said conditional operation on said pixel data packet.

7. The method of claim 1, wherein said setting said conditional execution flag comprises initializing a mask of bit values in a header of said pixel data packet.

8. The method of claim 1, wherein said conditional execution flag is operable to exempt said pixel data packet from a first instruction of said plurality of instructions and operable to indicate that a second instruction should be performed on said pixel data packet.

9. A GPU (graphics processing unit) for loading and executing a shader program, said GPU comprising:
an integrated circuit die comprising a plurality of stages of said GPU;
a memory interface for interfacing with a graphics memory; and
a host interface for interfacing with a computer system, wherein said plurality of stages comprises a graphics pipeline configured to:
load a plurality of instructions for a plurality of modules within said graphics pipeline based on a plurality of instruction packets;
receive a pixel data packet into said graphics pipeline;
evaluate said pixel data packet with reference to a conditional test prior to said pixel data packet being processed by an arithmetic logic unit (ALU), wherein said conditional test is operable to comprise a plurality of conditional operations to be evaluated;
set a conditional execution flag, associated with said pixel data packet, to indicate whether or not to apply said conditional instruction to said pixel data packet, wherein said conditional execution flag comprises a plurality of indicators each corresponding to a respective conditional operation associated with said pixel data packet and each of said plurality of indicators operable to indicate whether each of a plurality of instructions are to be performed on said pixel data packet; and
use a result of said conditional test to determine whether or not to apply a conditional instruction from said plurality of instructions to said pixel data packet.

10. The GPU of claim 9, wherein one of said plurality of modules comprises a conditional execution controller.

11. The GPU of claim 10, wherein said conditional execution controller is configured to evaluate said pixel data package with reference to said conditional test.

12. The GPU of claim 11, wherein said conditional execution controller is further configured to apply a conditional execution flag to said pixel data packet.

13. The GPU of claim 9, wherein said conditional execution flag comprises a bit value in a header portion of said pixel data packet.

14. The GPU of claim 9, wherein said conditional execution flag comprises a plurality of bit values in a header portion of said pixel data packets.

15. A method of conditional execution of instructions, said method comprising:
loading a plurality of instructions into a functional module via a plurality of instruction packets, said plurality of instructions comprising a plurality of conditional instructions;
evaluating a pixel data packet using a conditional test, wherein said evaluating of said pixel packet data using said conditional test is prior to said pixel data packet being processed by an arithmetic logic unit (ALU), and wherein said conditional test is operable to comprise a plurality of conditional operations to be evaluated;
setting a conditional execution flag associated with said pixel data packet to indicate said result of said conditional test, wherein said conditional execution flag comprises a plurality of indicators each corresponding to a respective conditional operation associated with said pixel data packet and each of said plurality of indicators operable to indicate whether instructions of said plurality of conditional instructions are to be performed on said pixel data packet; and
using a result of said conditional test to determine whether or not to apply each of said plurality of conditional instructions to said pixel data packet.

16. The method of claim 15, wherein said plurality of instructions further comprises instructions for manipulating graphical data.

17. The method of claim 15, wherein said evaluating said pixel data packet is performed by a conditional execution controller in a graphics pipeline.

* * * * *